(12) United States Patent
Yang (10) Patent No.: US 7,068,011 B2
(45) Date of Patent: Jun. 27, 2006

(54) SERIES CHARGER WITH SEPARATE DETECTION OF BATTERIES (BATTERY SET)

(76) Inventor: Fu-I Yang, 5th Floor, 101, Hsin Pu 8th Street, Taoyuan City (TW)

( * ) Notice: Subject to any disclaimer, the term of this patent is extended or adjusted under 35 U.S.C. 154(b) by 131 days.

(21) Appl. No.: 10/460,364

(22) Filed: Jun. 13, 2003

(65) Prior Publication Data

US 2004/0145347 A1 Jul. 29, 2004

Related U.S. Application Data

(63) Continuation-in-part of application No. 10/350,064, filed on Jan. 24, 2003, now Pat. No. 6,784,638.

(51) Int. Cl.
*H02J 7/00* (2006.01)

(52) U.S. Cl. .................... 320/119; 320/116

(58) Field of Classification Search ............. 320/119, 320/116, 115, 117, 122, 124, 126, 127, 128, 320/123, 132, 134, 157, 158, 159, 161, 2, 320/3, 6, 7, 11, 15, 17, 18, 20; 307/64, 66, 307/77
See application file for complete search history.

(56) References Cited

U.S. PATENT DOCUMENTS 3,984,753 A * 10/1976 Uchida et al. ............... 363/124
6,784,638 B1 * 8/2004 Yang ............................ 320/119

* cited by examiner

*Primary Examiner*—Donald Sparks
*Assistant Examiner*—Lawrence Luk
(74) *Attorney, Agent, or Firm*—Rosenberg, Klein & Lee (57) ABSTRACT

The present invention relates to a series charger with separate detection of batteries which includes a charging control device for converting the inputted AC power into DC power so as to charging four batteries in series connection. The charging control device further provides a reference voltage source to a control IC which is connected with a current detector for measuring the current value of the batteries. Each of the series-connected batteries is parallel-connected with a switch element. A one-way diode is interposed between the positive end of the batteries and each of the switch elements. Besides, the control IC provides $-\Delta V$ to the positive terminal of the respective charging circuit of the batteries for detecting the end-point voltage thereof. When each of the batteries is fully charged, the respective switch element is switched in a close circuit so that the charging current continues to flow downward for further charging operation. Moreover, after all batteries are fully charged one after another, the current detector is used to regulate the charging current or the switch-on time of the switch elements is controlled for proceeding with supplementary charging procedure.

1 Claim, 10 Drawing Sheets

SERIES CHARGER WITH SEPARATE DETECTION OF BATTERIES (BATTERY SET)

RELATED PATENT APPLICATIONS

This patent application is a continuation-in-part of Ser. No. 10/350,064, filed on 24 Jan. 2003, now U.S. Pat. No. 6,784,638.

BACKGROUND OF THE INVENTION

1. Field of the Invention

The present invention relates to a charger for NiH/NiCd secondary batteries, and more particularly, to a charger through which a plurality of batteries in series connection can be charged. Moreover, a control IC (integrated circuit) and a detection circuit are utilized to detect and control every battery (battery set) in series connection.

2. Description of the Prior Art

Since portable electronic products, such as digital cameras, game players, etc. become more and more popular, a greater capacity of secondary batteries is more required. In addition, the charging time is preferably shorter and the charger's volume is preferably smaller. Therefore, a smaller and cheaper feature with shorter charging time and longer service life is the common requirements of the modern chargers.

Figure 1:
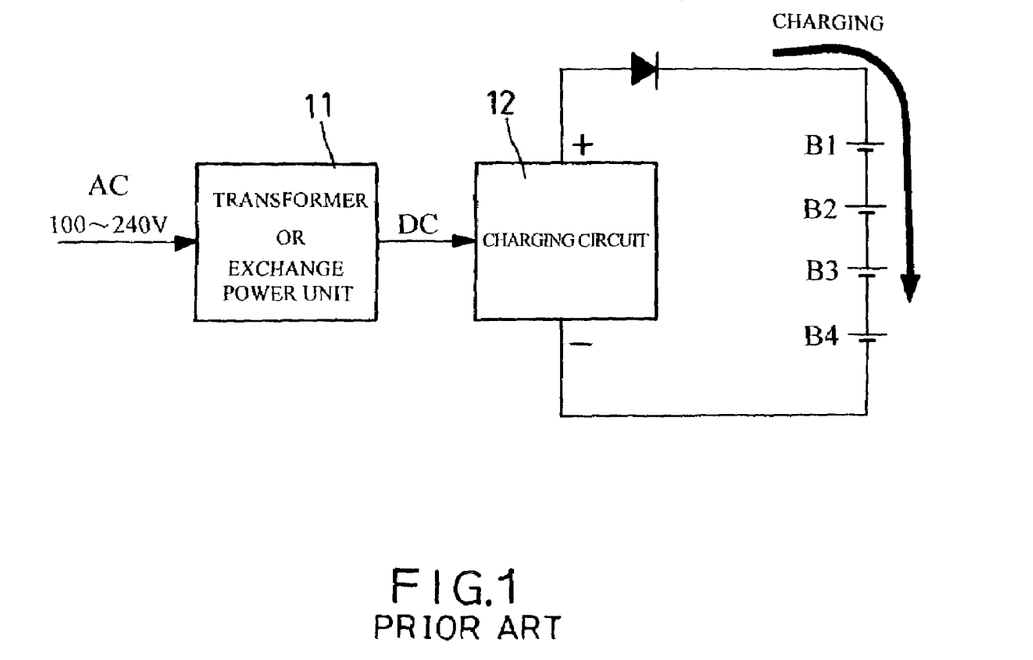
FIG. 1 is a schematic drawing of a conventional charger in series circuit.

The conventional NiH/NiCd battery chargers have their own advantages and disadvantages. However, they still can't reach the expected effect and need to be improved. These are described as follows:

Referring to FIG. 1, a conventional series charger is shown. This charger utilizes a transformer or an exchange power unit 11 to convert the power mains AC 100~240V into DC 2~5V. Meanwhile, the batteries B1, B2, B3, B4 . . . in series connection are charged by a charging circuit 12. This charging mode has advantages of simple configuration and low price. However, its disadvantage lies in that one is fully charged while the other is not. This will easily lead to overcharge of the full-charged battery when the charging process is continued, thereby lowering its service life.

Figure 3:
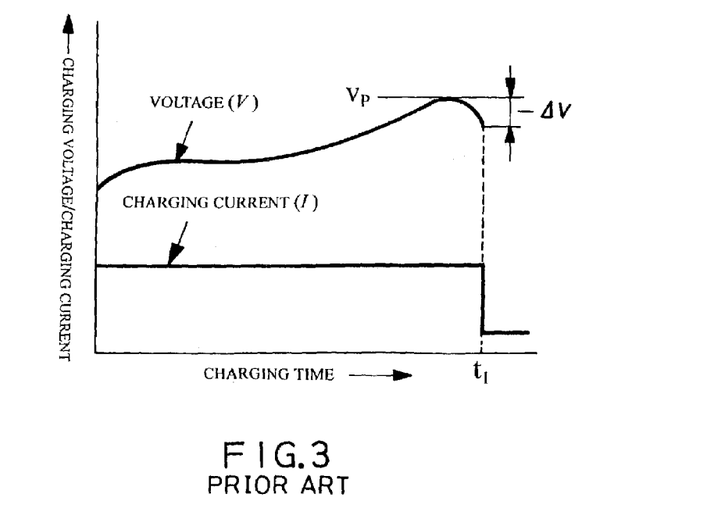
FIG. 3 is a diagram showing that $-\Delta V$ is utilized to detect the fully charging status.

The reason for that lies in that most of the commercially available smart chargers utilize $\Delta V$, as shown in FIG. 3, to detect the full-charging point of the NiH/NiCd secondary battery. In other words, when one battery is fully charged (Vp), its voltage begins to reduce by $\Delta V$. However, the voltage of the not-fully-charged battery still rises. Therefore, the summed voltage of the charged batteries in series connection won't be reduced such that the fully charged batteries will be overcharged until all batteries are fully charged. In case of abnormality of one battery, an unexpected danger could happen.

Besides, another disadvantage of the series charger lies in that single battery can't be charged. A charging loop can only be created only when all series-connected batteries to be charged are connected together.

Figure 2:
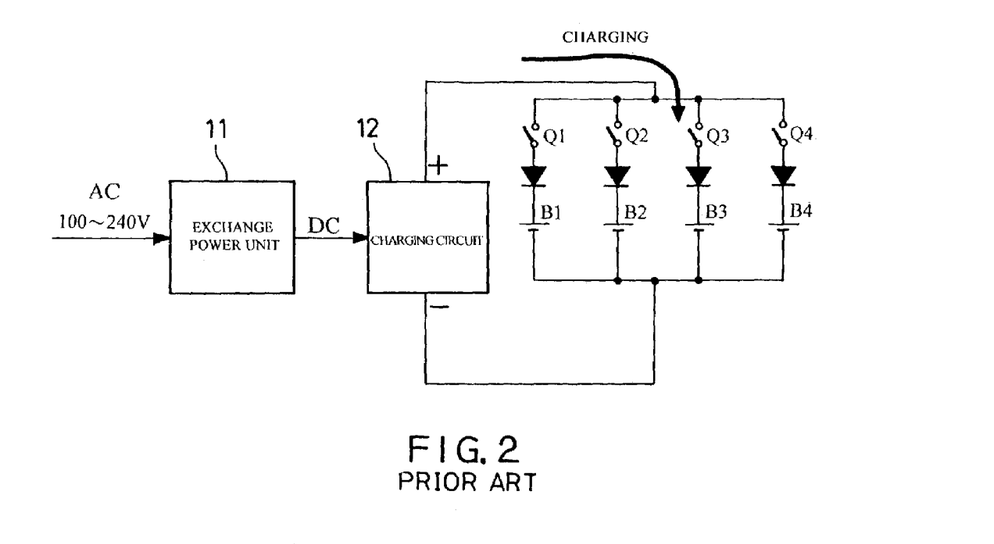
FIG. 2 is a schematic drawing of a conventional charger in parallel circuit.

Referring to FIG. 2, a conventional charger in parallel is shown. All parallel-connected batteries B1, B2, B3, B4 are charged by a charging circuit 12. The advantage thereof lies in that every battery has almost the same charging voltage without disadvantages of overcharge or being not-fully-charged status of the series batteries. However, the greatest disadvantage of the parallel charger lies in that it can't meet the requirements of speedy charging because the choice and the installation of the electronic control elements are difficult. Supposed that the charging voltage is 2V, and the charging current of each parallel-connected battery is 1.5 A, the required total current will be 6 A. However, the diode of the electronic components has problem with internal resistance while the transistor has problem with pressure difference. To create a low-voltage and high-current charging loop has much to be overcome. For example, it's difficult to fulfill the safety requirement that the wiring of the circuit board has to amount to over 6 mm. Thus, the volume of the parallel charger can't be reduced. Moreover, the components are easily over-heated. Furthermore, the rapid charging requirement can't be fulfilled. If the voltage is increased to enhance the power for reducing the current value, the four switch transistors Q1, Q2, Q3, Q4 will due to the pressure difference produce a high temperature which is difficult to be overcome. And to add cooling elements will increase the whole volume and the material cost.

SUMMARY OF THE INVENTION

Therefore, it is a primary object of the present invention to eliminate the aforementioned drawbacks and to provide a series charger with separate detection of batteries (battery set) which meets the market requirements, is rapidly charged, has high use safety, small volume and achieves the largest charging capacity.

BRIEF DESCRIPTION OF THE DRAWINGS

The accomplishment of this and other objects of the invention will become apparent from the following descriptions and its accompanying drawings of which.

DETAILED DESCRIPTION OF THE PREFERRED EMBODIMENT

Figure 4:
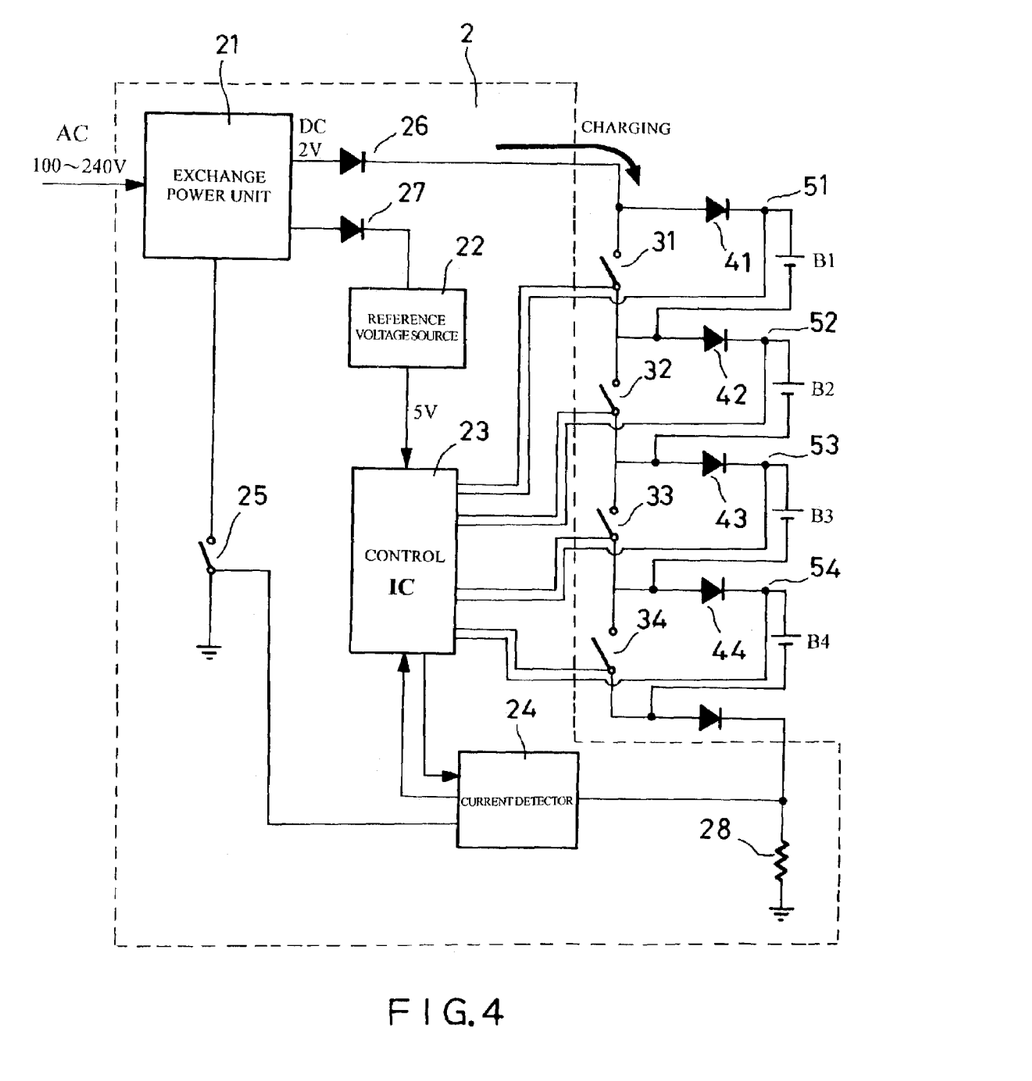
FIG. 4 is a block diagram of a first embodiment of the present invention for charging four batteries.
Figure 4A:
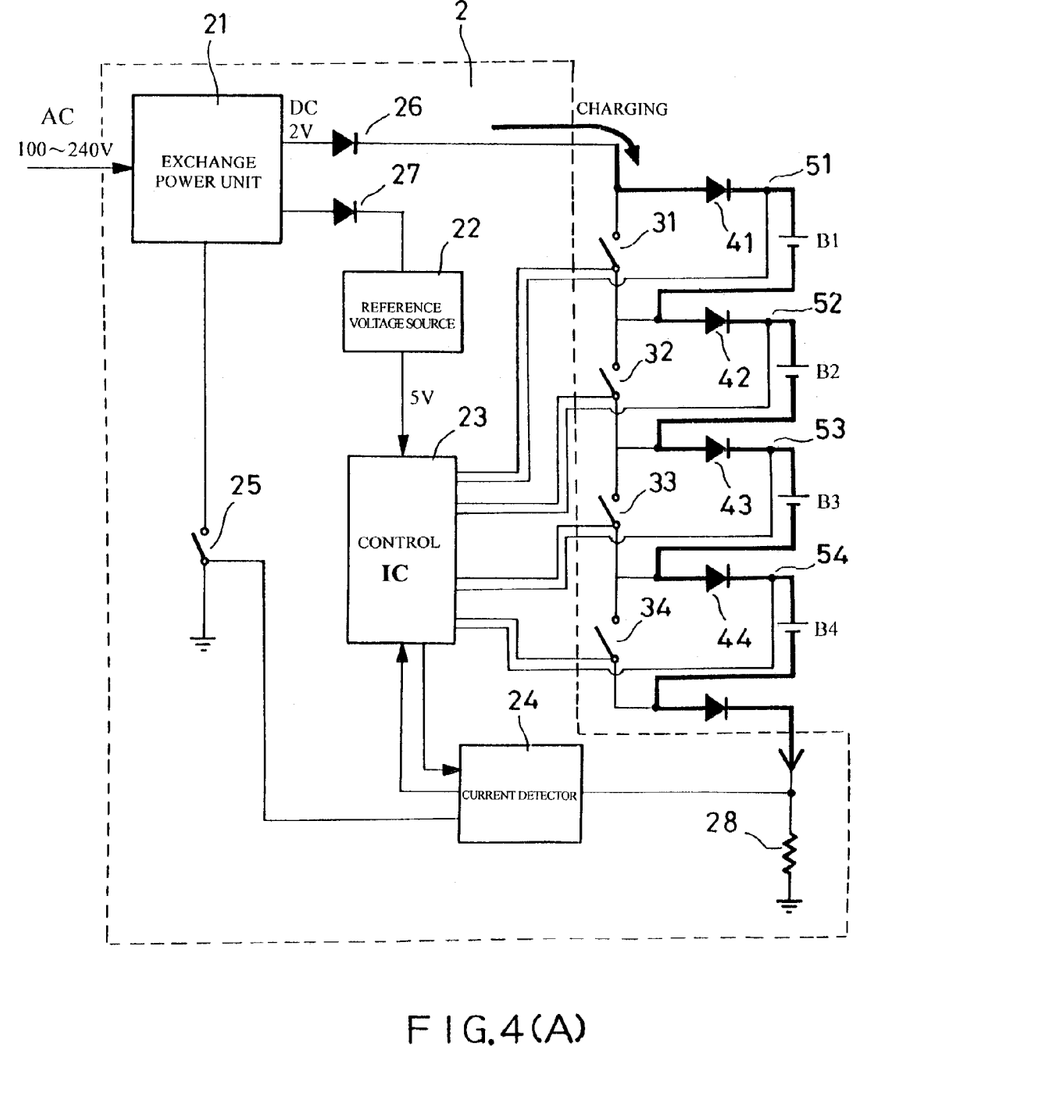
FIG. 4(A) is a first circuit diagram of series batteries in charged state.

First of all, referring to FIG. 4, a block diagram of main components of the charger of the present invention which includes:

a charging control device 2 having an exchange power unit 21 for converting the inputted AC power into DC power so as to charging four batteries B1 through B4 in series connection, the charging control device 2 further providing a reference voltage source 22 to a control IC 23 which is connected with a current detector 24 for measuring the current value of the batteries; and each of the series-connected batteries B1 through B4 being parallel-connected with a switch element 31, 32, 33, 34, a one-way diode 41, 42, 43, 44 being interposed between the positive end of the batteries and each of the switch elements 31, 32, 33, 34.

Figure 4B:
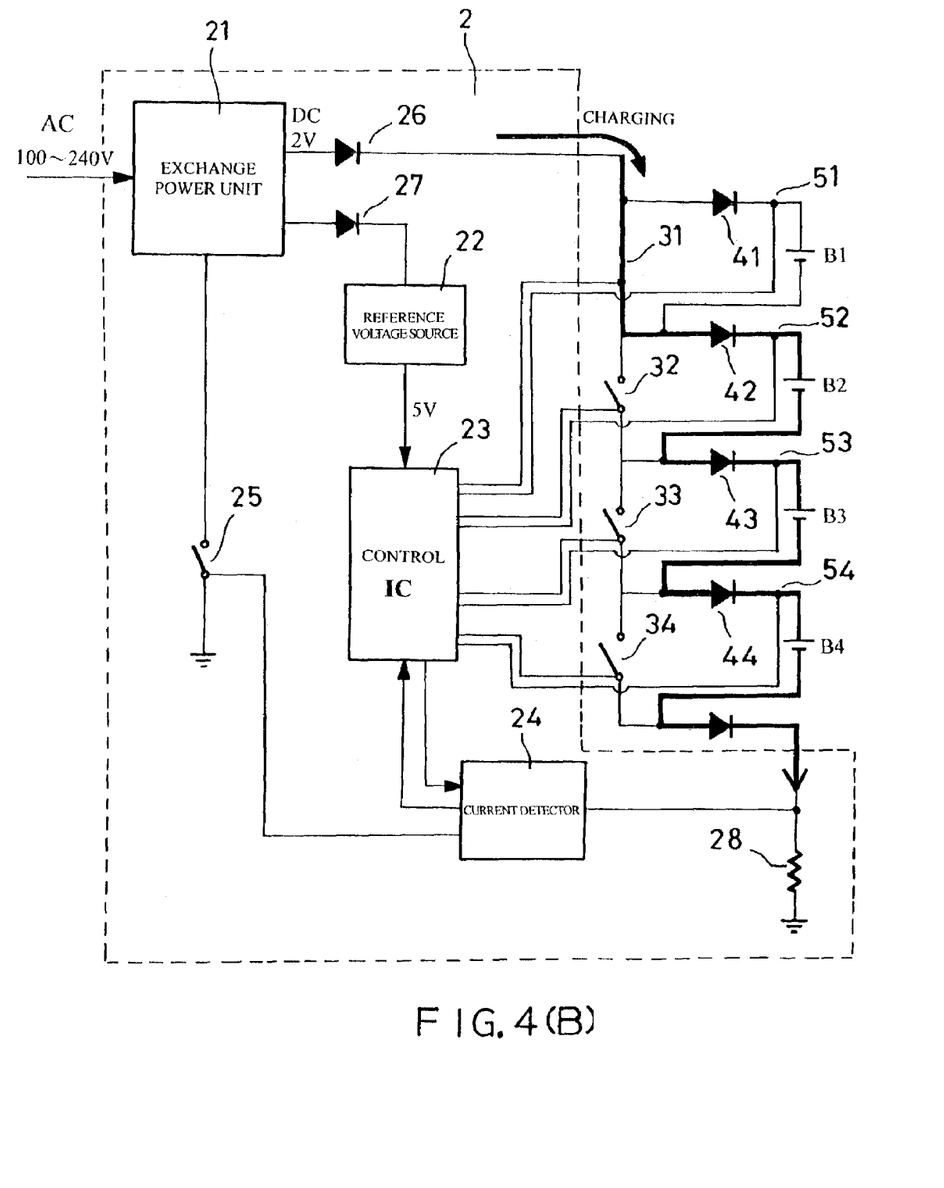
FIG. 4(B) is a second circuit diagram of series batteries in charged state.

The control IC 23 provides −ΔV to the positive terminal of the respective charging circuit of the batteries for detecting the end-point voltage thereof. Moreover, the charging current, as illustrated in FIG. 4, flows through each of the series-connected batteries B1 through B4 at the beginning of charging. The switch element 31 is switched in a close circuit when the battery B1 is fully charged so that the battery B1 won't be overcharged, as illustrated FIG. 4B, and the next battery B2 will then be charged. That is, each of the switch elements 31, 32, 33, 34 is switches in a close circuit when the corresponding battery is fully charged so that the charging current flows downwards and charges the other one. The current detector 24 is controlled to reduce the current to a small value (e.g. 0.2 A) for proceeding with supplementary charging operation of all series-connected batteries B1 through B4 as the last battery is fully charged. And, the power switch 25 is shut off for stopping the charging operation after the supplementary charging operation is completed.

The power switch 25 is constructed as a light-coupling transistor interposed between the exchange power unit 21 and the current detector 24.

Besides, the present invention further features that the control IC 23 can be used to control the switch-on time of each of the parallel-connected switch elements 31, 32, 33, 34. These switch elements are made by switch transistor. Therefore, when the battery is fully charged, the switch transistor is switched on such that the charging current flows downwards for further charging operation. When the last battery is fully charged, the control IC 23 let each of the switch elements 31, 32, 33, 34 continuously switch on and off for proceeding with the supplementary charging operation of all series-connected batteries B1 through B4 with little charging current. Thus, each of the rapidly charged batteries B1 through B4 can be charged to a fuller state.

The charging control device 2 further includes two one-way diodes 26, 27 at the output terminal of the exchange power unit 21. Moreover, the detection terminal of the current detector 24 is provided with a resistance 28.

Figure 5:
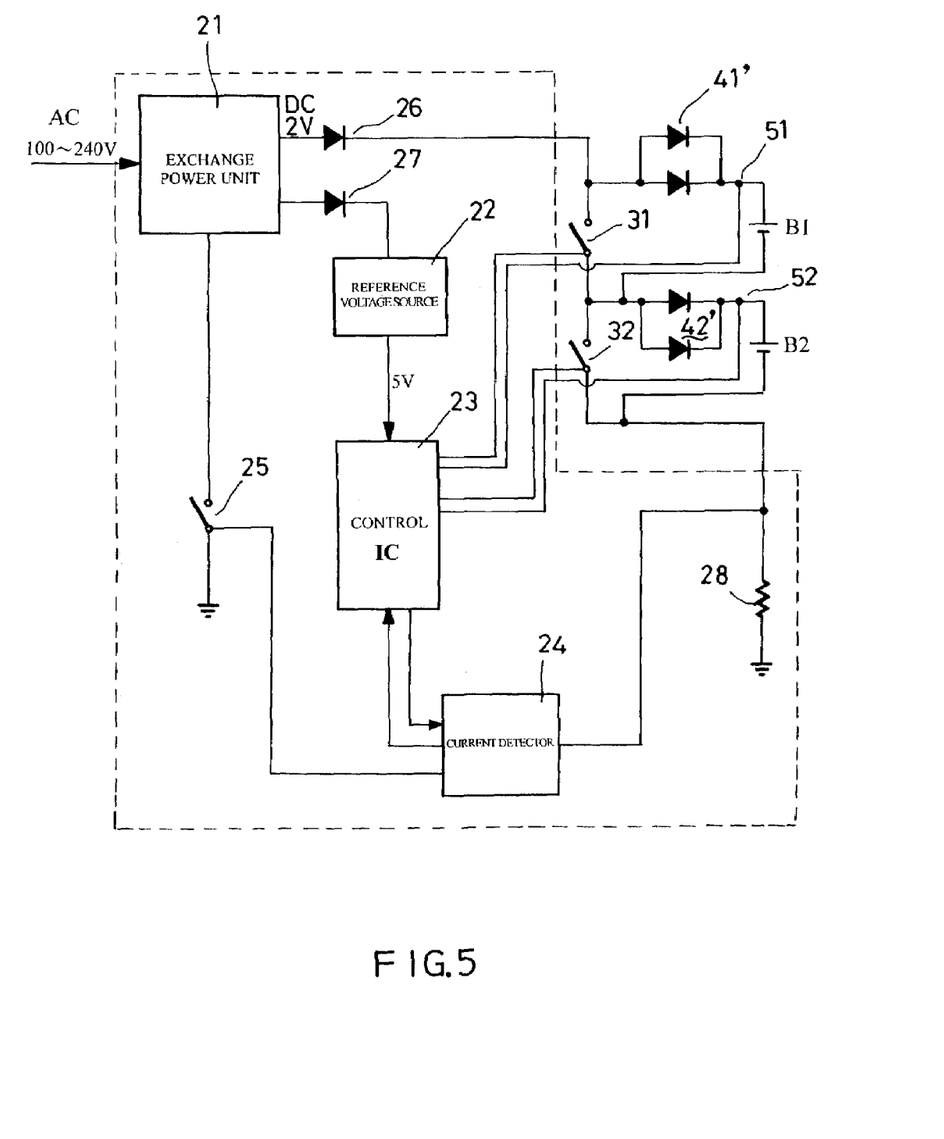
FIG. 5 is a block diagram of a second embodiment of the present invention for charging two batteries.

Referring to FIG. 5, a block diagram of a second embodiment of the present invention for charging two batteries B1 and B2 is shown. In this embodiment, two diodes 41' are connected in parallel.

Figure 6:
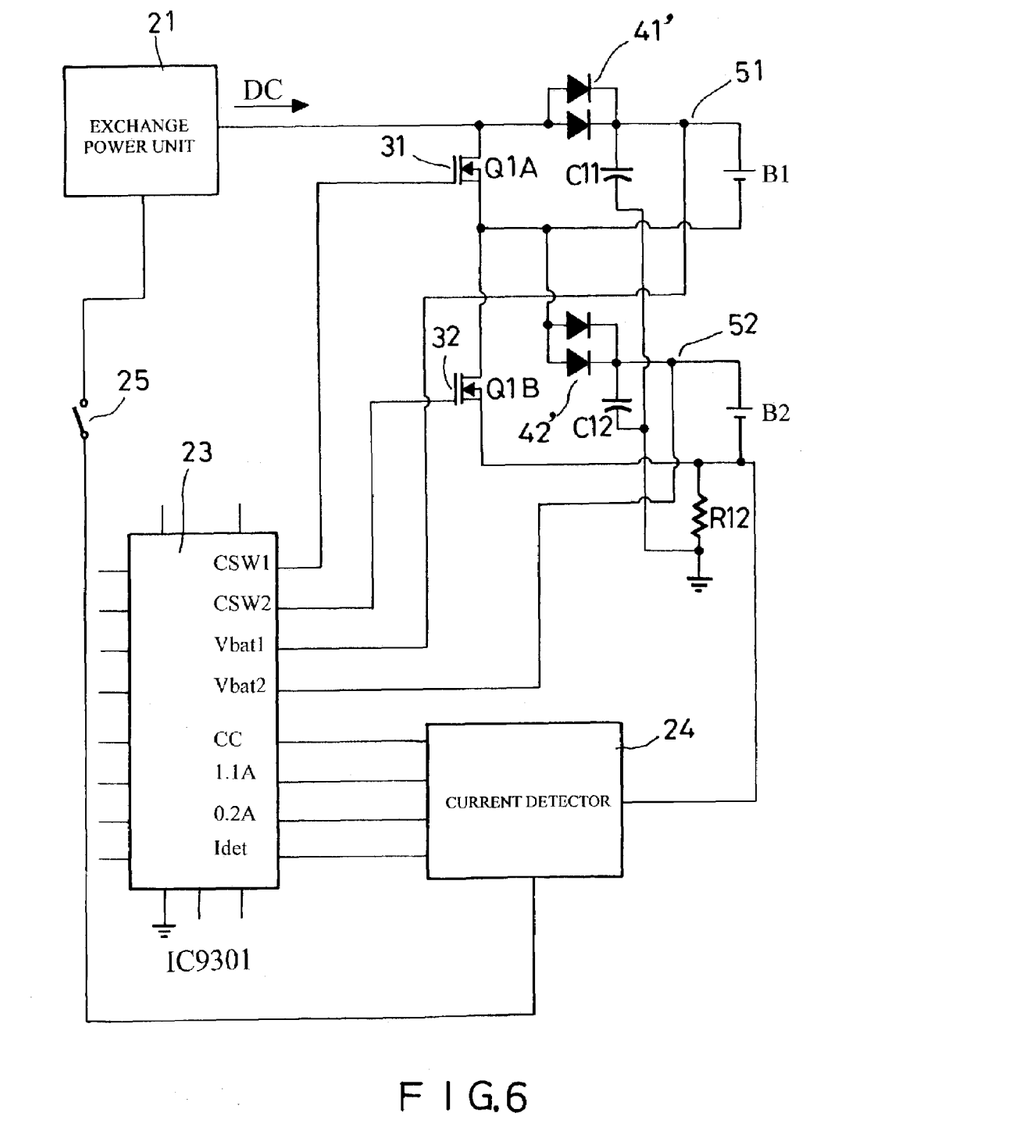
FIG. 6 is a detailed circuit diagram of FIG. 5.
Figure 7:
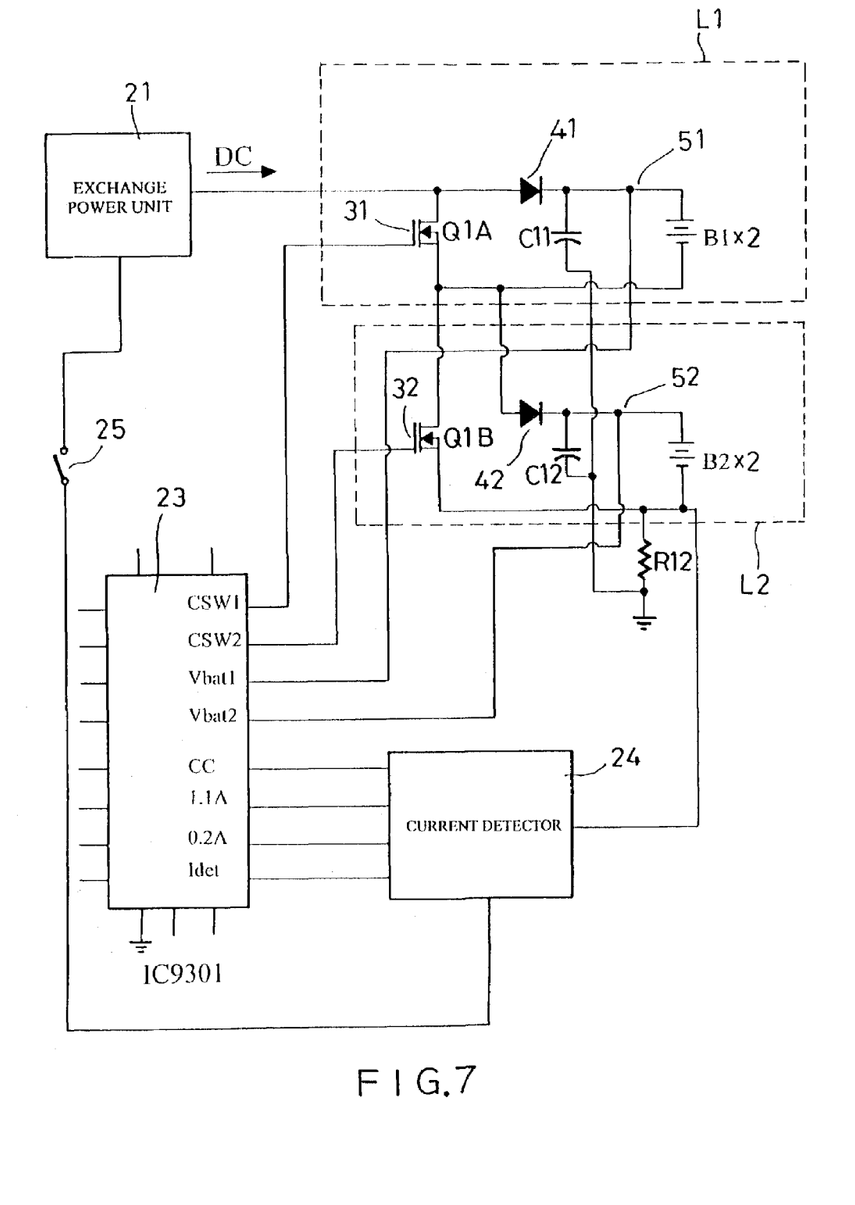
FIG. 7 is a circuit diagram of a third embodiment of the invention for detecting control.
Figure 8:
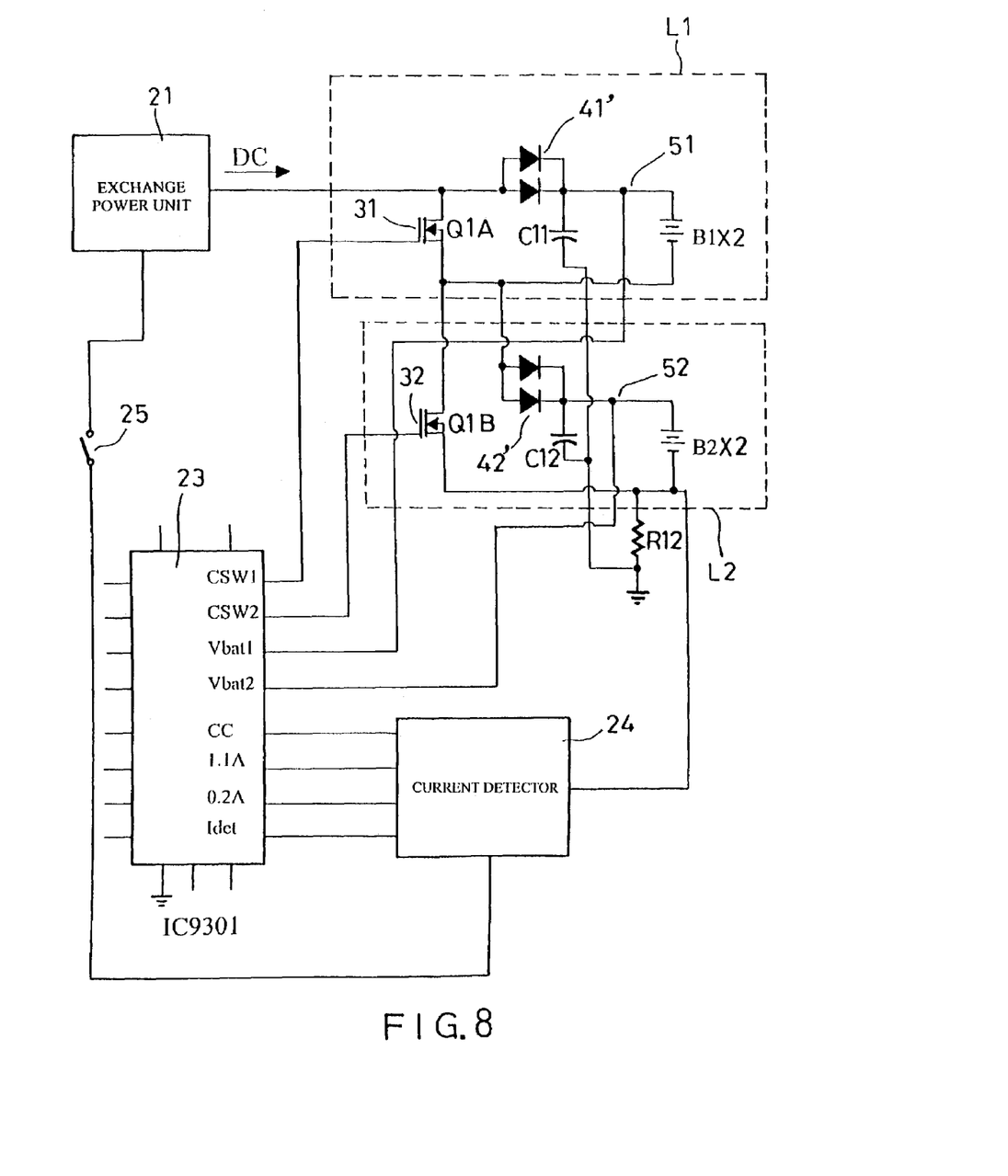
FIG. 8 is a circuit diagram of a fourth embodiment of the invention for detecting control.

Referring to FIG. 6, a detailed circuit diagram in accordance with FIG. 5 is shown. The switch elements 31, 32 of the present invention are made by power type MOSFET (metal oxide silicon field effect transistor) Q1A, Q1B. The gate pole is connected with the control IC 23 while the source pole is connected with the drain pole of another MOSFET Q1B. The negative pole of both diodes 41', 42' is in connection with capacitors C11, C12 for filtering waves. The connection feet Vbat1, Vbat2 of the control IC 23 are connected with the positive terminal of each of the batteries B1, B2 for creating a loop to detect their end-point voltage. Accordingly, each of the batteries B1, B2 has its own detection loop. When the battery B1 is fully charged, the switch element 31 (MOSFET Q1A) is switched on to let the charging current flow through such that the battery B1 won't be charged any more. Similarly, when the battery B2 is fully charged, the switch element 32 is also switched on. The chargers for four or eight batteries in series connection are also operated in the same way. The voltage and current detection loop of each of batteries B1 through B4 performs the comparison operation by the control IC 23 made according to the above-mentioned requirements. Therefore, no matter what kind of brand or which characteristic the NiH/NiCd batteries belongs or has, the series charger with separate detection of batteries of the present invention can completely utilize the detection way of −ΔV to judge if each of the batteries is fully charged and to determine if the power switch 25 should be shut off. This can ensure full charging of batteries without overcharge. Due to the use of the series-connection mode and the switch elements 31, 32, the connection of MOSFET and the circuit can be easily achieved. Moreover, the power loss at the input terminal is lower. Thus, the configuration of the whole circuit of the present invention is simpler. Besides, a commercially available battery set consists of two batteries attached by a rubber film. Since they are produced by the same procedure and consumed in the same time, the required charging voltage is identical or very similar. It's impractical when they are separated for detecting and charging processes. Therefore, the above-mentioned series charger with separate detection of batteries can be configured as two batteries in one set (B1×2) and (B2×2), thereby forming a separate charging loop L1, L2. The two series-connected battery sets (B1×2) and (B2×2). The separate charging loops L1, L2 is based on the above-mentioned technique and is parallel-connected with switch elements 31, 32. The one-way diodes 41, 42 are interposed between the switch elements 31, 32 and the positive terminal of battery sets, as two parallel-connected diodes 41' are shown in FIG. 8. The control IC 23 individually undergoes −ΔV process to detect the terminal voltage of series-connected battery sets (B1×2) and (B2×2) of the battery positive terminals 51, 52 of the charging loops L1, L2, respectively. Similarly to the above-mentioned features, when the battery set (B1×2) is fully charged, the switch element 31 is turned on so that the battery set (B1×2) is not charged any more. To the contrary, the battery set (B2×2) is continuously charged. When all battery sets are fully charged, the current detector 24 undergoes the current adjustment to slightly charge the battery sets (B1×2) and (B2×2). After completion of slight charging process, the power switch 25 is cut off to stop charging process.

Figure 9:
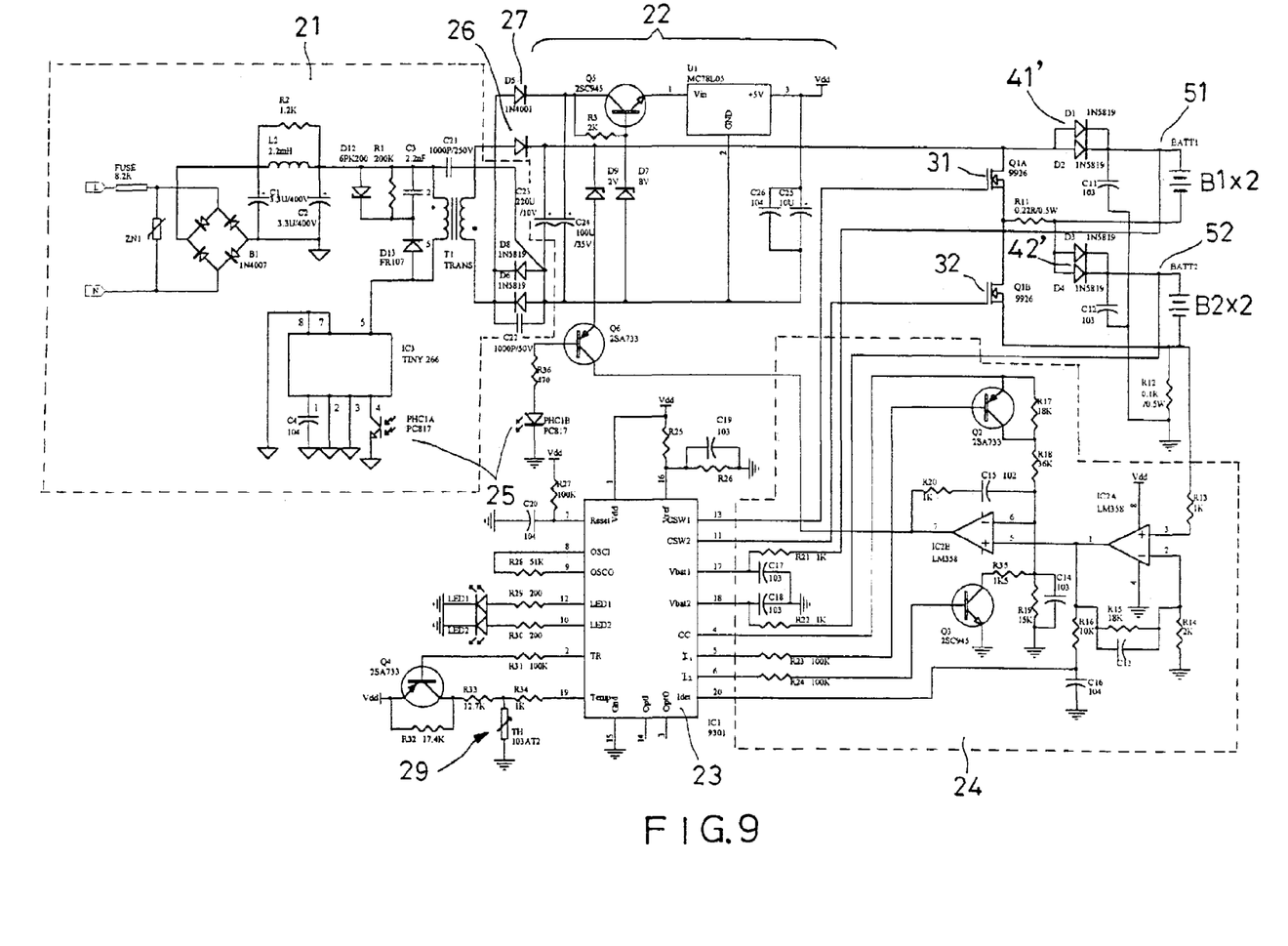
FIG. 9 is a detailed circuit diagram in accordance with FIG. 8.

When one well-trained in the arts of electronic engineering makes use of the circuit diagram of FIG. 9 to create a charger unit, all of the aforementioned effects can be attainable. Meanwhile, all components can be mounted on one circuit board, thereby achieving the light-weight and compact requirements. As for the exchange power unit 21, the reference voltage source 22, the current detector 24 and the temperature-regulating circuit 29 in connection with the control IC 23, their configuration and functions are not objects of the present invention so that no further descriptions are given hereinafter.

In addition to the above-mentioned effects, the present invention based on the above-mentioned configuration also features that, when any one of the batteries malfunctions, the charging operation of other batteries won't be influenced since the switch element MOSFET is automatically switched on. Moreover, the single one battery can also be charged unlike the conventional series charger that can't charge only one battery.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A series charger with separate detection of batteries, comprising:

a plurality of sets of series-connected batteries forming individual charging loops, each set being a pair of series-connected batteries, the charging loops each being parallel-connected with a respective switch element, a one-way diode being interposed between the switch elements and a positive terminal of a respective battery set;

a charging control device having an exchange power unit for converting input AC power into DC power for charging the plurality of series-connected batteries, the charging control device providing a reference voltage source to a control IC connected with a current detector, the control IC individually undergoing a $-\Delta V$ process to detect the terminal voltage of the series-connected battery sets within the respective charging loops, a respective switch element being turned on responsive to a corresponding one of the battery sets being fully charged to further charge another of the battery sets, the current detector undergoing a current adjustment for slightly charging the battery sets responsive to all of the battery sets being fully charged; and a power switch coupled between the current detector and the exchange power unit for terminating charging after completion of the slight charging of the battery sets.

* * * * *